United States Patent [19]

Orimo et al.

[11] Patent Number: 4,829,516
[45] Date of Patent: May 9, 1989

[54] SYSTEM STRUCTURE RECOGNITION METHOD FOR A MULTILOOP TRANSMISSION SYSTEM

[75] Inventors: Masayuki Orimo, Machida; Kinji Mori, Yokohama; Yasuo Suzuki, Ebina, all of Japan

[73] Assignee: Hitachi, Ltd., Tokyo, Japan

[21] Appl. No.: 854,836

[22] Filed: Apr. 23, 1986

[30] Foreign Application Priority Data

Apr. 24, 1985 [JP] Japan .................................. 60-86351

[51] Int. Cl.$^4$ .............................................. H04J 3/02
[52] U.S. Cl. ........................................ 370/88; 370/89; 340/825.05
[58] Field of Search ........................ 370/86, 88, 89, 90, 370/94, 16, 13; 340/825.05, 825.52, 825.07, 825.01; 371/8

[56] References Cited

U.S. PATENT DOCUMENTS

3,787,627  1/1974  Abramson et al. .................... 370/89
4,677,615  6/1987  Orimo et al. ............................ 370/89

Primary Examiner—Douglas W. Olms
Attorney, Agent, or Firm—Antonelli, Terry & Wands

[57] ABSTRACT

A system structure recognition method for a multiloop transmission system for recognizing the system structure of a transmission system consisting of a plurality of loop transmission lines, a plurality of devices connected with each of a plurality of transmission control devices disposed on each of the loop transmission lines, and relay terminals connecting the loop transmission lines with each other includes a step of sending the message to the loop transmission lines after having added an address to the data portion of the message, when a message for system recognition reaches each of the transmission control devices from the loop transmission lines and a step, in which, when the message for system recognition reaches one of the relay terminals from one of the loop transmission lines, the message is sent to the other loop transmission line after having inserted a flag representing a relay of the message between different loops in the data portion of the message for system recognition.

19 Claims, 7 Drawing Sheets

FIG. 4a   ADDRESS SERIES AREA

| $A_1$ | $A_2$ | $A_3$ | $A_4$ | ———————— | ~400 |

FIG. 4b   LOOP AREA  ~401

| $L_{11}$ | $L_{12}$ | $L_{13}$ | $L_{14}$ | ———————— |
| $L_{21}$ | $L_{22}$ | $L_{23}$ | $L_{24}$ | ———————— |
| $L_{31}$ | $L_{32}$ | $L_{33}$ | $L_{34}$ | ———————— |

FIG. 4c   RERAY POINTER AREA

| $E_1(1)$ | $E_1(2)$ | ————— | ~402 |
| $E_2(1)$ | $E_2(2)$ | ————— |
| $E_3(1)$ | $E_3(2)$ | ————— |

FIG. 4d   BACK POINTER AREA

| $BP_1$ | ~403 |
| $BP_2$ |

FIG. 4e   FORWORD POINTER AREA

| $FP_1$ | ~404 |
| $FP_2$ |

FIG. 5

ADDRESS SERIES ANALYSIS TREATMENT

FIG. 6a ADDRESS SERIES IN DATA PORTION OF LOOP TRAIN

FIG. 6c RELAY POINTER AREA $E_i(k)$

FIG. 6b LOOP AREA $(L_{ij})$

SYSTEM STRUCTURE RECOGNITION METHOD FOR A MULTILOOP TRANSMISSION SYSTEM

BACKGROUND OF THE INVENTION

This invention relates to a system structure recognition method for a multiloop transmission system consisting of a plurality of loop transmission groups and more in detail to a method for recognizing the structure of devices connected to form a plurality of interconnected transmission loops by means of messages circulating through the loops.

Japanese Patent Application Kokai (un-examined publication) No. Shoo 57-166756 has disclosed a multiloop transmission system, where a plurality of loops are connected to each other, and where message transmission between different loops is effected, depending on the content of data, without knowing the structure of the loops and the address of the receiver. Although this method has an advantage easily controlling which messages are to be transferred between different loops depending on circumstances and another advantage that it is not necessary to provide network control processors for the relay operation, it has a problematical point with respect to maintenance of the system, because there are no measures for recognizing at any time with what system structure this multiloop system is operated. Message transmission between different transmission control devices connected to a single loop transmission system is described in U.S. Pat. No. 4,366,479.

SUMMARY OF THE INVENTION

The object of this invention is to provide a method which makes it possible to resolve the problem of the prior art techniques described above and to recognize the system structure of a multiloop system at an arbitrary point of time.

According to this invention, when each of the network control processors (hereinbelow abbreviated to NCP) connected to each of the loops receives a message for recognizing the system structure called a loop train, it adds its own address to a message and makes it flow to other loops. Further, a relay processor connected between two loops adds a flag representing a relay to each of the loop train messages coming from an NCP connected with the relay processor itself and sends it to other loops. The structure of the multiloop system is recognized by using the message returning after having circulated through all of the loop transmission lines.

DESCRIPTION OF THE PREFERRED EMBODIMENTS

Hereinbelow this invention will be explained more in detail by using some embodiments.

Figure 1:
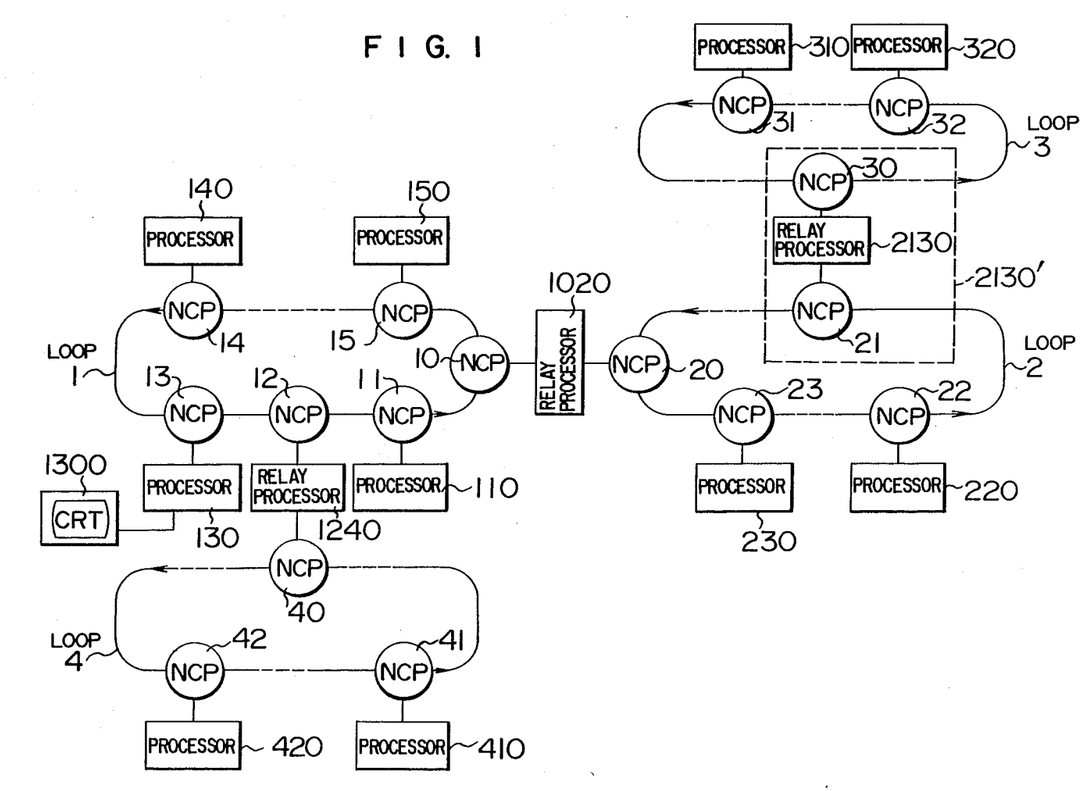
FIG. 1 is a scheme for explaining a system, to which this invention is applied.
Figure 2:
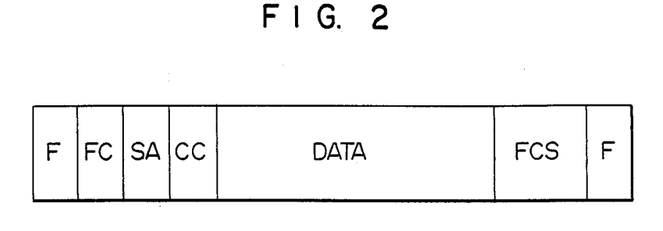
FIG. 2 shows the format for the messages sent to the transmission loops.

FIG. 1 is a scheme illustrating an overall configuration of a system, in which the system structure recognition method according to this invention is brought into operation. Four loops (transmission lines) 1, 2, 3, 4 are connected through NCPs and relay processors with each other. The loops 1 and 2 are connected through NCPs 10, 20 and a relay processor 1020; the loops 2 and 3 through NCPs 21, 30 and a relay processor 2130; and the loops 1 and 4 through NCPs 12, 40 and a relay processor 1240 with each other. Two NCPs (e.g. 21 and 30) and a relay processor connected therebetween (e.g. 2130) can be brought together so as to be a relay processing device 2130', as indicated by a broken line. In the loops 1, 2, 3 and 4 are connected NCPs 10–15, 20–23, 30–32 and 40–42, respectively, each of which forms a node on the loop to which it belongs. To the NCPs 11, 13, 14, 15, 22, 23, 31, 32, 41 and 42 are connected processors 110, 130, 140, 150, 220, 230, 310, 320, 410 and 420, respectively. To the NCPs 10 and 20, 21 and 30, and 12 and 40 are connected relay processors 1020, 2130 and 1240, respectively, each of which is common to the two loops with which it is connected. All the NCPs 10–15, 20–23, 30–32 and 40–41 are identical and thus the NCPs 10, 20, 21, 30, 12 and 40 need not have any special function, which is different from that of the other NCPs. Further, in this embodiment, it is supposed that the processor 130 is a system tester, which should recognize the multiloop system structure. However, it can be arbitrarily determined in what location of which loop the system tester is disposed. To the system tester is connected a CRT display device 1300 for displaying the system structure which has been recognized. Instead, a printer outputting the recognized system structure can be used. FIG. 2 shows an example of messages to be transmitted. FC indicates a content code, i.e. a function code, which corresponds to the content or the function of the message. SA indicates the address of the NCP, which has written out and transmitted the message (source address) and CC a serial number, which is necessary for distinguishing it from the others, when the same message should be again transmitted. Further, "Data" represents information to be transmitted or treated. FCS shows data for detecting errors. F is a flag indicating the beginning and the ending of a message and each of them is e.g. a binary number of 8 bits 11111111. Each of the NCPs judges whether the same function code as that stored in its register is contained in each of the messages flowing through the loop, to which it belongs, or not, and takes-in the messages necessary for it, which are sent to its processor.

The function code, which the processor connected to each of the NCPs requires, is previously registered in each of the NCPs, as follows. Each of the processors sends the function codes of messages, which are necessary for itself, to the Data portion indicated in FIG. 2, and registered data, whose function code indicates a function code registration ($FC_r$) is set in the FC portion in FIG. 2, to the NCP connected to it, at the starting moment at the node, i.e. at the place of connection, that is, when the processor is connected at first or again after an interruption for some reason (e.g. change of the loop structure or trouble). In the case where the function code portion of the registered data is an $FC_r$ indicating a function code registration, the NCP, which has received the registered data from the processor, stores the content of the Data portion, i.e. the function code necessary for a device treating the connection, in its register, and at the same time sends it along the loop in the direction indicated by arrows after having rearranged the message in the format indicated in FIG. 2. Furthermore, when a message, which an NCP has transmitted as a transmitter, returns thereto after having made a circulation through the loop to which it belongs, the NCP removes the message, supposing that the function of the loop is normal and that the source address SA is unique. If the message doesn't return in a determined period of time, the NCP repeats the transmission a predetermined number of times, until the message returns.

Further, the relay processor 1020 sends data where the function code indicating a function code registration ($FC_r$) is set in the Data portion and the FC portion, to the NCPs 10 and 20; the relay processor 2130 sends them to the NCPs 21 and 30; and the relay processor 1240 sends them to the NCPs 12 and 40 at the starting moment at their places of connection. The following treatment at each of the NCPs is identical to that described above. By the treatment described above the function code, which is required by the processor connected with each of the NCPs 11, 13-15, 21-23, 31-32, and 41-42, is registered therein and the function code of the message to be transmitted between different loops is registered in the NCPs 10, 20, 21, 30, 12, and 40. The explanation of the function code registration method and the data transmission/reception method for a multiloop system in detail will be omitted, because an example of them is described in detail in the above mentioned U.S. Pat. No. 4,366,479, entitled "Control Information Communication Method and System through a Common Signal Transmission Line", or Japanese Patent Application "Transmission Control Method", un-examined publication No. Shoo 57-166756.

Hereinbelow the system structure recognition method for the multiloop transmission system described above will be explained, referring to FIGS. 3-7.

The processor or system tester 130 indicated in FIG. 1 registers the function code $FC_l$ indicating the loop train for recognizing the system structure, i.e. information indicating in what loop and in what order what sort of address processor is connected, in the register of the NCP 13 at its starting moment or when it is necessary. In addition, the relay processors 1020, 2130 and 1240 register not only the function code ($FC_r$) indicating the function code registration in the NCP connected with each of them but also the function code ($FC_l$) indicating the loop train.

The processor 130 sends data to the NCP 13 connected with it, in which data a function code ($FC_l$) indicating the loop train is set in the FC portion in FIG. 2, in order to recognize the system structure, and the Data portion is empty. The NCP 13, which has received the loop train data for the recognition from the processor 130, shapes the message in the format indicated in FIG. 2, after having added its own address of the NCP (cf. the beginning of FIG. 3b) to the Data portion (indicated in FIG. 2), and sends the data to the loop 1, after having set its own address of the NCP in the SA portion indicated in FIG. 2 for showing that the NCP itself is the source of the transmission in the loop 1. Then, the NCP 12 ($N_1$ in FIG. 3a), which has received this message from the loop 1, recognizes from the function code $FC_l$ that it is not a function code FC indicating that is a message to be transmitted but it is a loop train, and sends it to the loop 1, after having added its own address of the NCP to the Data portion of the message. When the received message is a message to be transmitted, which is usually transmitted and received, the message is sent to the succeeding NCP with the Data portion unchanged. At the NCP 12, since the function code ($FC_l$) of the loop train is registered therein the received message is sent not only to the NCP 11 but also to the relay processor 1240. The NCP 11, which has received this message from the loop, adds its own address of the NCP to its Data portion and sends it to the loop 1, but doesn't send it to the processor 110, because the function code $FC_l$ is not registered therein. The other NCPs perform in a manner similar to that described above in the loop train.

Further, the relay processor 1240, which has received the loop train from the NCP 12, sends the function code $FC_l$ and the Data portion to the NCP 40, after having added a value obtained by multiplying its own address by "$-1$" (negative value) as a flag for indicating a message relay to its Data portion, only when the number of relay flags added by itself in the Data portion is not greater than 2. The NCP 40, which has received the loop train data from the relay processor 1240, effects the treatment similar to that for the NCP 13. That is, it shapes the message in the format indicated in FIG. 2, after having added the own address of the NCP to its Data portion, and sets its own address in the SA portion indicated in FIG. 2, i.e. it becomes then a source for the transmission in the loop 4 to send the message to the loop 4. The other relay portions perform in a completely identical manner. In addition, each of the NCPs sends the message to the processors or to the relay processors connected to itself, even if the message includes data produced by itself, in the case where the function code $FC_l$ is registered in it.

Figure 3A:
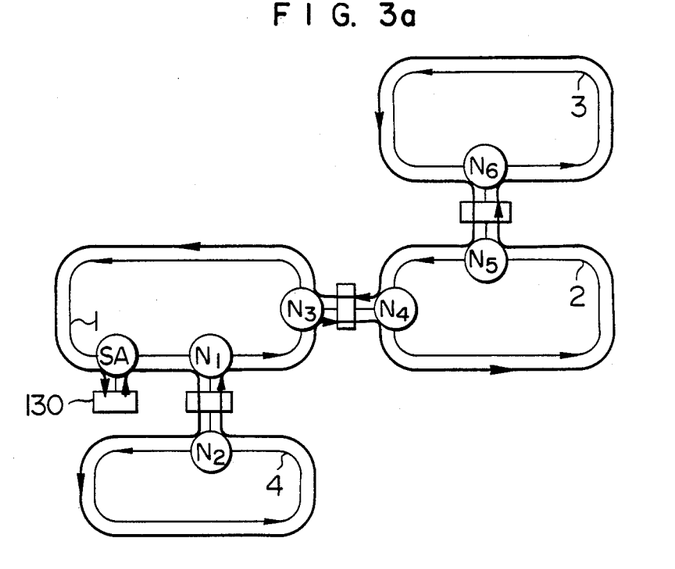
FIG. 3a is a scheme illustrating the path of the messages flowing through the system indicated in FIG. 1.
Figure 3B:
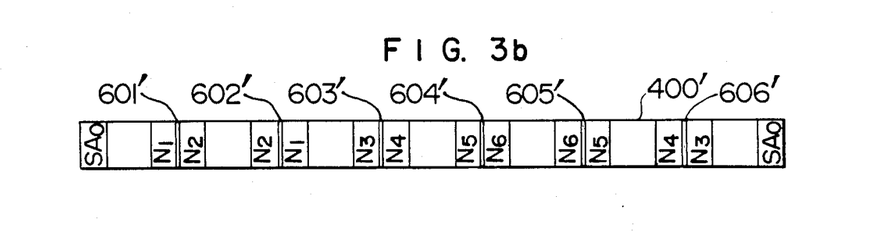
FIG. 3b illustrates address series data obtained after a circulation of the train message through the FIGS. 4a–4e illustrate data analysis areas in a system tester.
Figures 4, 4A:
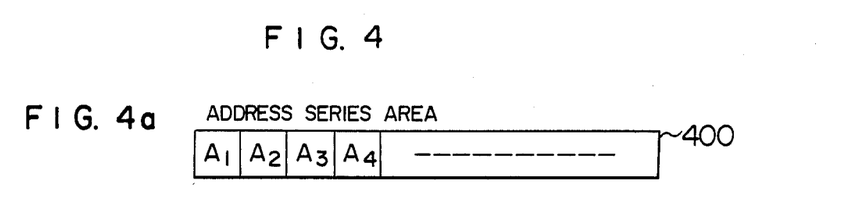
Figure 4B:
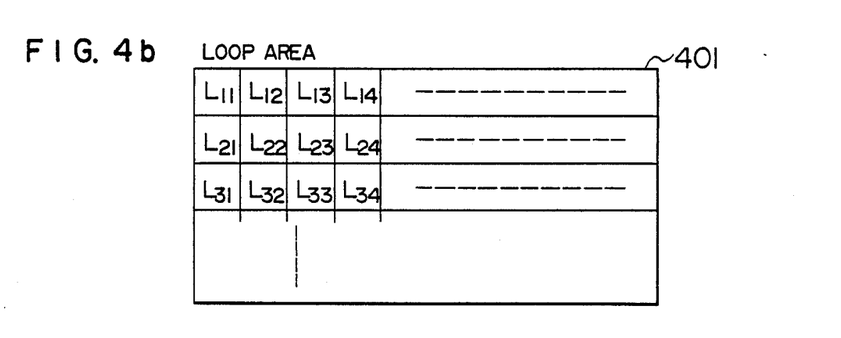
Figure 4C:
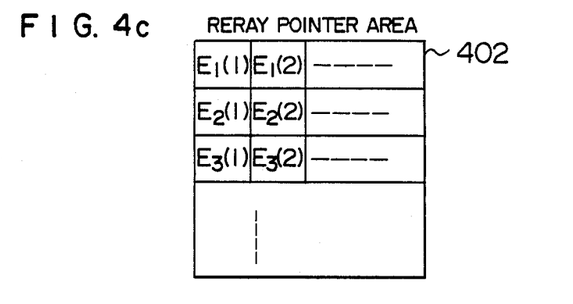
Figure 4D:
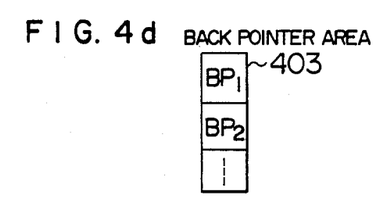
Figure 4E:
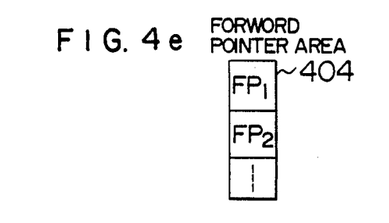
Figure 5:
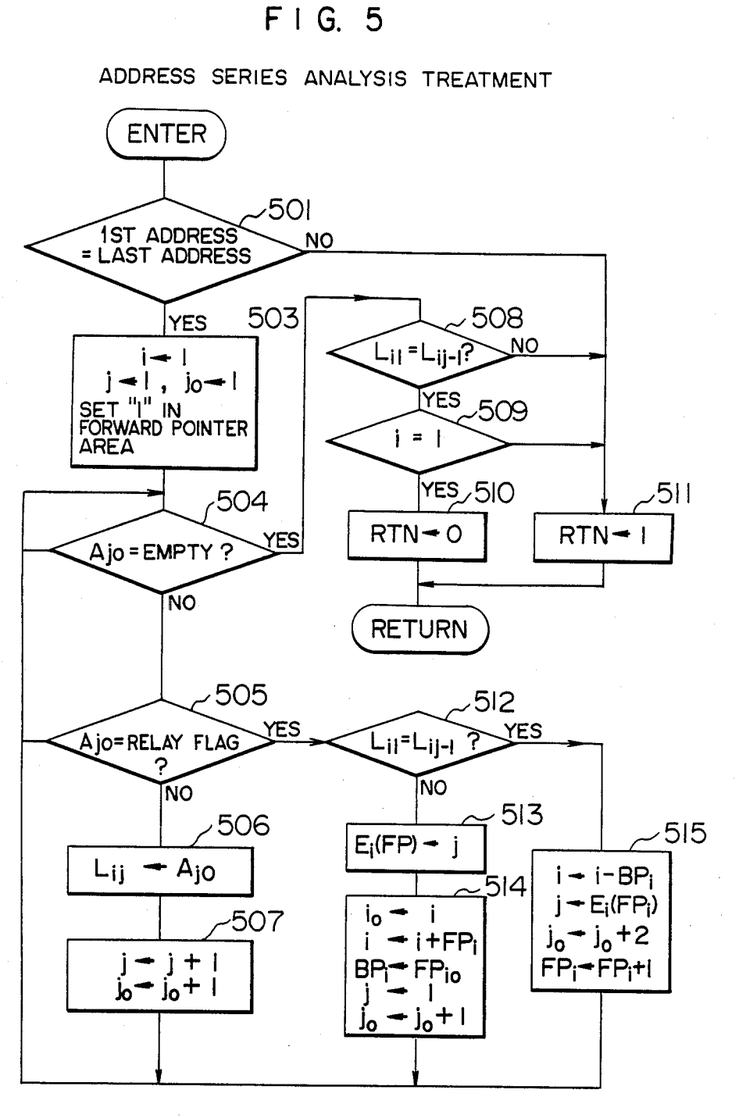
FIG. 5 indicates steps for the treatment of the address series analysis.

By the function of each of the NCPs and that of each of the relay processors described above, the loop train produced by the processor 130, which is the system tester, returns finally to the processor 130, following the path indicated by a heavy line in FIG. 3a, where SA, $N_1$, $N_2$, $N_3$, $N_4$, $N_5$ and $N_6$ are the addresses of the NCPs 13, 12, 40, 10, 20, 21 and 30 in FIG. 1. In the source address portion SA of the loop train message, which has returned to the first loop 1 is inscribed the address $N_3$ of the NCP connected to the relay processor. When this message has circulated through the loop 1 and returned again to the NCP 10, whose address is $N_3$, the NCP 10 judges that the message has returned thereto and eliminates it. The content of the Data portion of the loop train, which has passed through the path indicated in FIG. 3a, starting from the processor 130, and returning thereto, is the series of addresses indicated in FIG. 6a. Here all the relay flags (negative values), which are added by every relay processor, are represented by CF. If there is another loop tester 130' (not shown in the figure) in the loop 3, which has transmitted a recognition demand message similar to that of the NCP 13, when the message transmitted by the NCP 13 is taken -in by the processor connected with the loop tester 130', it is ignored, owing to the fact that the address at the beginning and that at the end in the data portion disagree with each other. When it is not necessary to count the number of relay flags, a one-bit flag ($601'$~$606'$) representing such relay may be added as shown in FIG. 3b ($400'$).

Figure 6A:
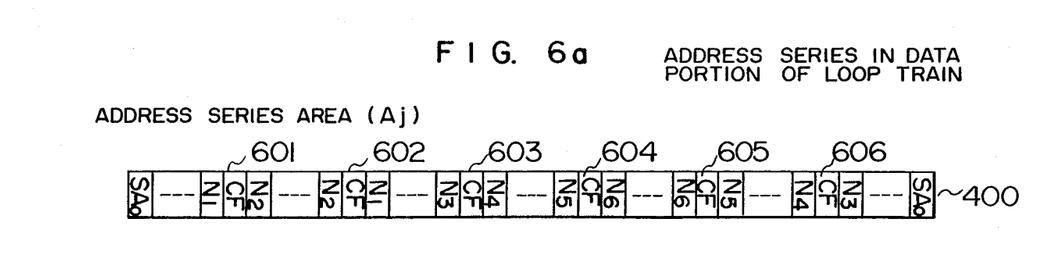
FIG. 6a illustrates address series data obtained after a circulation of the train message through the system.
Figure 6B:
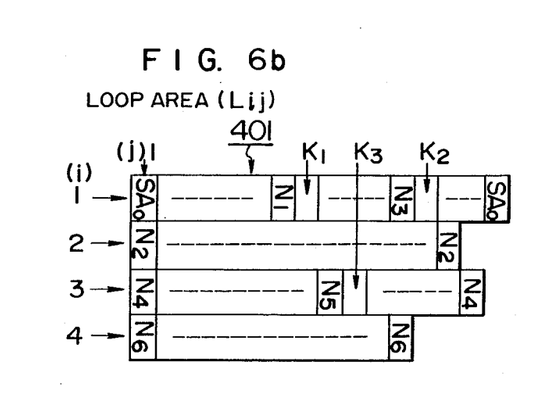
FIGS. 6b and 6c illustrate data areas indicating the process of the address series analysis.
Figure 6C:
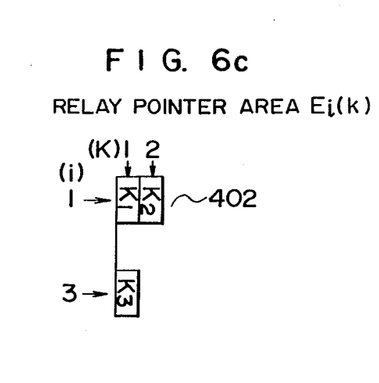

The treatment performed in the system tester having received the loop train, which has circulated through the multiloop system and returned thereto, will be explained, referring to FIGS. 4a-7. FIGS. 4a-4e show data areas in the system tester. An address series area 400 is an area, in which the Data portion (FIG. 6a) of the received loop train is stored as it is. A loop area 401 is an area, in which the NCP addresses representing the result obtained by analyzing the address series in the Data portion of the loop train are stored and each of the lines corresponds to one loop. A relay pointer area 402 is an area, in which the pointers representing the position of the NCPs connected to the other loops are stored for every loop and the lines in this area correspond to the lines of the loop area 401. A back pointer area 403 and a forward pointer area 404 are work areas for performing address series analysis treatments. Next the address series analysis treatments by means of each of the areas will be explained, referring to FIGS. 5, 6a, 6b and 6c. FIG. 6a shows the content of the address series area 400 to be analyzed. FIGS. 6b and 6c show the content of the loop area 401 and that of the relay pointer area 402, respectively, after the termination of the treatment indicated in FIG. 5. Hereinbelow the treatments will be explained, referring to FIG. 5.

At first it is judged whether the first address of the address series area 400 is in accordance with the last address or not (Step 501). In the case where they are not in accordance with each other, which means that the loop train data is not produced by the NCP itself, "1" is set in the return code (RTN) and the treatment is terminated. In the case where they are in accordance with each other, which means that the loop train is produced by the NCP itself, the treatment proceeds to Step 503, where an initial value is set. Next, by repeating Steps from 504 to 507, SA of the address series to the first $N_1$ are set in the first line of the loop area 401 (FIG. 6b). After that, in Step 505, a relay flag CF 601 (FIG. 6a) is detected and the treatment proceeds to the judgment in Step 512. $K_1$ is set in $E_1(1)$ of the relay pointer area (Step 513), owing to the fact that SA and $N_1$ in the first line of the loop area are not in accordance with each other in Step 512. Here $K_1$ indicates the number of the line succeeding $N_1$ stored in the first line of the loop area (FIG. 6b). Further, in Step 514, the pointer i indicating the line of the loop area is changed from 1 to 2 and "1" is set in the back pointer area $BP_2$. In addition, a subtraction operation needed when the process returns from a loop area Lij written out later to the present loop (at the beginning of Step 515), is prepared. After that, by repeating Steps from 504 to 507 an address series $N_2 \ldots N_2$ (between CF 601 and CF 602 in FIG. 6a) is set in the second line (FIG. 6b) of the loop area 401 (FIG. 6b). Then, in Step 505, CF 602 is detected and the process proceeds to the judgment in Step 512. Since the first and the last address of the second line of the loop area are in accordance with each other in Step 512, the process proceeds to Step 515. In Step 515, owing to the fact that the loop of the second line of the loop area is closed, the line pointer i of the loop area is returned from 2 to 1 and $K_1$ is set in the pointer j indicating the row of the loop area. In addition the value of the forward pointer $FP_1$ is increased by 1 to 2 and the formation of a new loop area Lij is memorized.

Next, by repeating Steps 504 to 507 the addresses up to $N_3$ before CF 603 of the address area are set in the first line of the loop area. Then, after the judgments in Steps 505 and 512, $K_2$, which is the number of the row succeeding $N_3$ stored in the first line of the loop area, is set in $E_1$ (2) in Step 513. Further, in Step 514, the line pointer i of the loop area is changed from 1 to 3 and 2 is set in the back pointer area $BP_3$. Next, by repeating again Steps 504–507, an address series $N_4$–$N_5$ is set in the third line of the loop area. Further, after the judgments in Steps 505 and 512, $K_3$, which is the number of the row succeeding $N_5$ stored in the third line of the loop area, is set in $E_3$ (1) in Step 513. Then, after the change treatment in Step 514, by repeating Steps 504–507, the addresses $N_6$–$N_6$ of the NCPs of the loop 3 is set in the fourth line of the loop area. Then, after the judgments in Steps 505 and 512, 3 and $K_3$ are set in the line pointer i and the row pointer j of the loop area, respectively. Further, by repeating Steps 504–507, the addresses $N_4 \ldots N_4$ of the NCPs of the loop 2 is set in the third line of the loop area. Next, after the judgements in Steps 505 and 512, 1 and $K_2$ are set in the line pointer i and the row pointer j of the loop area in Step 515. Further, by repeating Steps 504–507, the addresses SA . . . SA of the NCPs of the loop 1 are set in the first line of the loop area. Then, in Step 504, since the address series area is empty, after the judgements in Steps 508 and 509 "0" is set in the return code RTN in Step 510 and the analysis treatment is terminated. Whether any of the loops registered in the area Lij has a common NCP address series is checked so as to recognize it as the same loop as the other.

Figure 7:
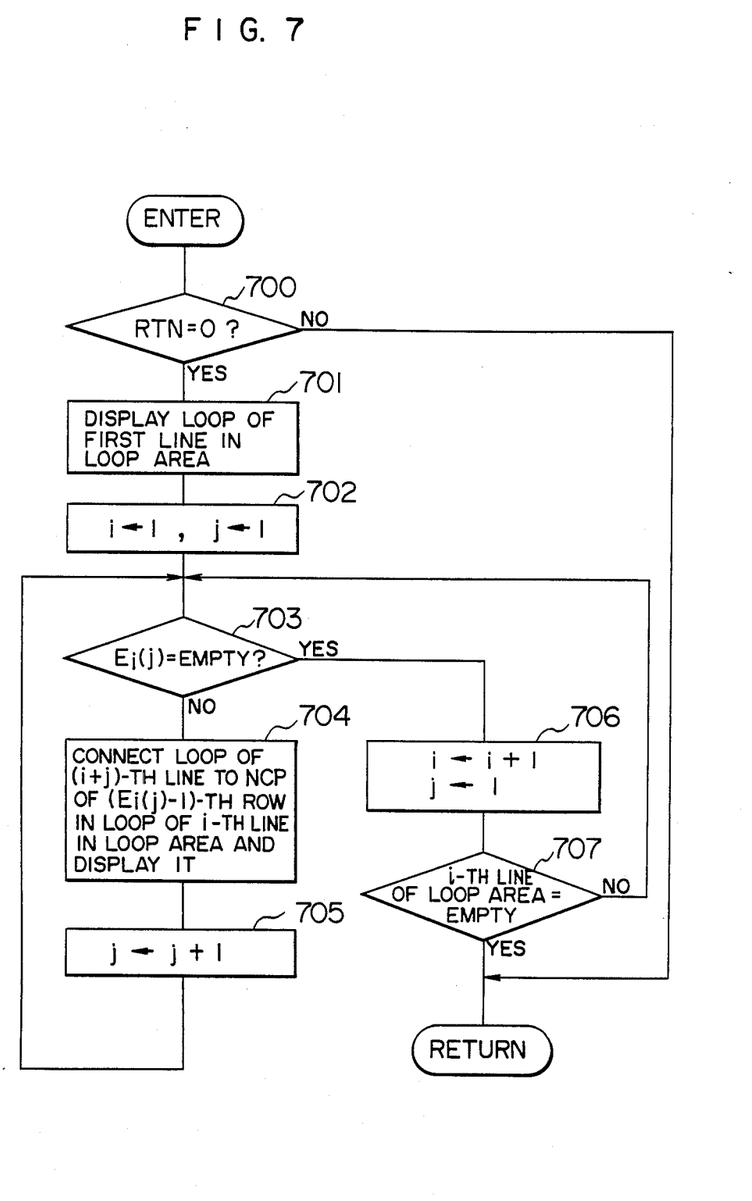
FIG. 7 indicates steps for displaying a result of the analysis.

After the address series analysis treatment described above has terminated, by using the content of the loop area and that of the relay pointer area indicated in FIGS. 6b and 6c, respectively, the relation of the connections between different loops is recognized according to the flow indicated in FIG. 7 and outputted to a display device 1300. Hereinbelow the treatment indicated in FIG. 7 will be explained. At first, it is judged by using the RTN whether the address series area analysis is successfully terminated (Step 700). Only when RTN=0, the loop of the first line of the loop area is displayed (Step 701) and the initialization is effected. Then, after the judgment in Step 703, it is recognized and displayed in Step 704 that the loop of the second line of the loop area is connected with an NCP of the ($K_1-1$)-th row in the loop of the first line of the loop area. Further, after having passed through Steps 705 and 703, it is recognized and displayed in Step 704 that the loop of the third line of the loop area is connected with an NCP of the ($K_2-1$)-th row in the loop of the first line of the loop area. Next, after having repeated twice the treatments in Steps 703, 706 and 707, it is recognized and displayed in Step 704 that the loop of the fourth line in the loop area is connected with an NCP of the ($K_3-1$)-th row of the loop of the third line in the loop area. Then, after having repeated the treatments in Steps 703–707, it is recognized by the judgment in Step 707 that the loop area is empty and the treatment is terminated.

According to the method described above, by analyzing the Data portion of the loop train, which has circulated through the system, it is possible to recognize the multiloop system structure. In addition, although the system structure is recognized in the processor 30 belonging to the loop 1 in this embodiment, according to this invention, the system structure can be recognized by an arbitrary processor belonging to an arbitrary loop and further not by only one processor but by a plurality of processors.

This method is useful not only in the case where a plurality of loops are connected with each of the loops of this embodiment and further a plurality of loops are connected with each of the first plurality of loops but also in the case where the system has no multiloop structure, but it has a single loop structure.

Figure 8:
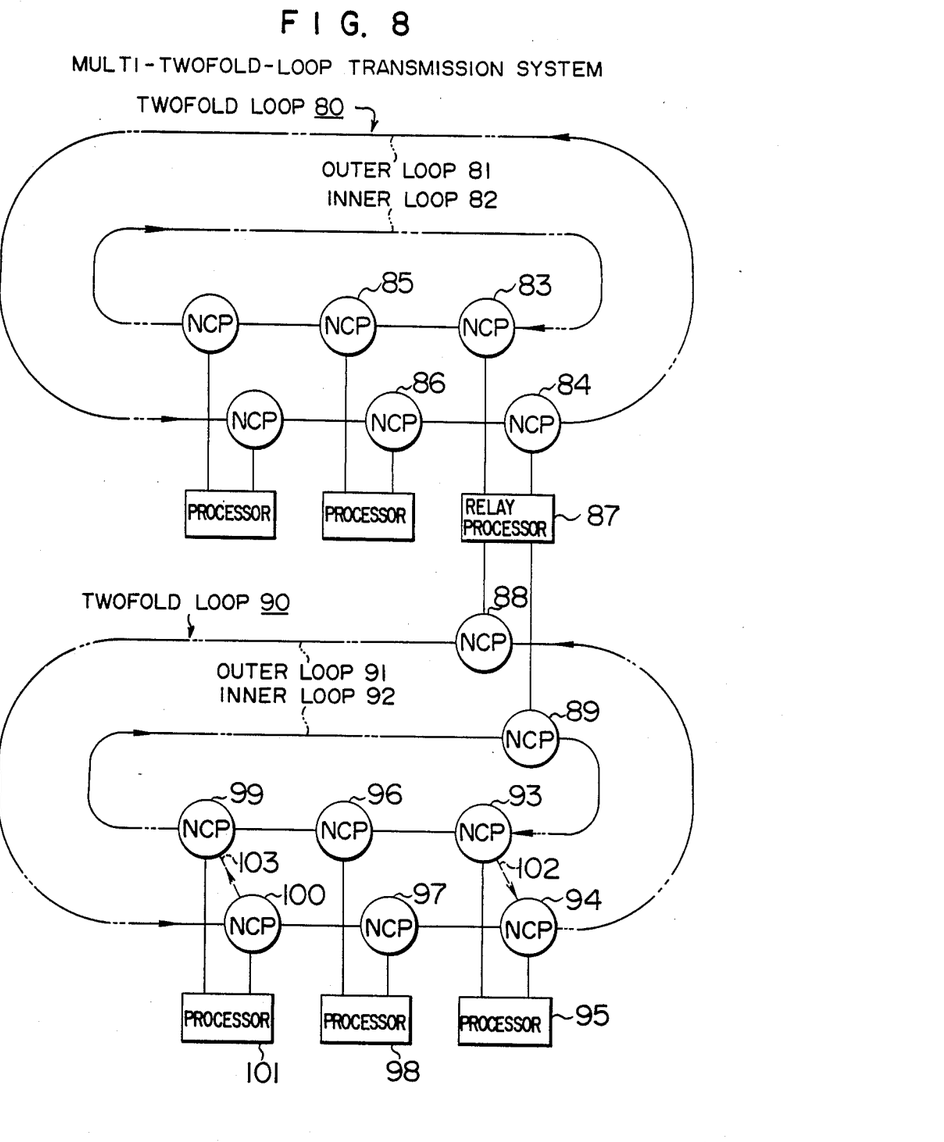
FIG. 8 is a scheme for explaining a system, to which this invention is applied.

Furthermore, although each of the loops is onefold in this embodiment, even when each of the loops is twofold, having two transmission directions different from each other, where a detour structure is possible, the structure can be recognized, as indicated in FIG. 8, at first by recognizing the relation of the connection of each of the loops and also between them according to this invention and then by applying the system structure recognition method for a loop transmission line, which this applicant has previously applied (Japanese Patent Application No. Shoo 59-125139), to each of the loops.

In FIG. 8, two twofold loops 80 and 90, each of which consists of an inner and an outer loop, are connected with each other through a relay processor 87. The message on the inner loops 82, 92 and that on the outer loops 81, 91 advance in the directions indicated by arrows. For example, when either one of the inner and the outer loops 91 and 92 connected with NCPs 97 and 96, respectively, is broken, messages can reach all the NCPs on the twofold loops 80 and 90 except for the NCPs 96 and 97, by flowing through two detours 89→93→94→88 and 88→100→99→89, as indicated by broken lines 102 and 103. Consequently it can be known that also in a twofold loop transmission system it is possible for an arbitrary processor to demand the system structure recognition and for the relay processor to add a flag representing a passage therethrough to the data portion of the message by attaching an address to each of the NCPs.

We claim:

1. A system structure recognition method for a multiloop transmission system having a plurality of lop transmission lines, a plurality of transmission control devices each connected in one of said loop transmission lines, a plurality of terminal devices each connected to one of said transmission control devices and at least one relay apparatus for connecting said loop transmission lines to each other, comprising the steps of:
    (a) when a transmission control device receives a message for system recognition, sending a message to said loop transmission line from said transmission control device after adding an address of that transmission control device to said received message for system recognition; and
    (b) relaying address information regarding said transmission control devices included in said message for system recognition to another loop transmission line when said relay apparatus receives a message for system recognition from a loop transmission line connected to said relay apparatus; and
    (c) when each of said relay apparatuses receives a message for system recognition from one of said loop transmission lines with which it is connected, it sends said message to the other of said loop transmission lines after having added information representing a relay operation between different loop transmission lines to the data portion of said message for system recognition.

2. A system structure recognition method according to claim 1, further comprising a step, when said relay apparatus receives said system recognition message from said loop transmission line, of sending a message to which is added the address of said relay apparatus and information representing a relay operation between different loop transmission lines.

3. A system structure recognition method for a multiloop transmission system having a plurality of loop transmission lines, a plurality of transmission control devices each connected in one of said loop transmission lines, a plurality of terminal devices each connected to one of said transmission control devices and at least one relay apparatus for connecting said loop transmission lines to each other, comprising the steps of:
    (a) when a transmission control device receives a message for system recognition, sending a message to said loop transmission line from said transmission control device after adding an address of that transmission control device to said received message for system recognition; and
    (b) relaying address information regarding said transmission control devices included in said message for system recognition to another loop transmission line when said relay apparatus receives a message for system recognition from a loop transmission line connected to said relay apparatus; and
    (c) adding, in said transmission control device, its own address to said system recognition message and for adding, in said relay apparatus information representing a relay operation between said loop transmission lines and an address of said relay apparatus to said system recognition message and for sending them to said loop transmission lines.

4. A system structure recognition method according to claim 3, further comprising a step, hen said relay apparatus receives said system recognition message from one loop transmission line, of ending said system recognition message to another loop transmission line to which it is connected.

5. A system structure recognition method according to claim 1, wherein said information added by each of said relay apparatuses has a value obtained by multiplying its own address by −1; further each of said relay apparatuses detects how many times said message for system recognition has passed through itself and comprises a step of relaying said message for system recognition to said other of said loop transmission lines, only when the number of times of passages is not greater than two.

6. A system structure recognition method according to claim 4, wherein said plurality of loop transmission lines constitute a twofold transmission line system.

7. A system structure recognition method for a multiloop transmission system having a plurality of loop transmission lines, a plurality of transmission control devices each connected in one of said loop transmission lines, a plurality of terminal devices each connected to one of said transmission control devices and at least one relay apparatus for connecting said loop transmission lines to each other, comprising the steps of:
    (a) when a transmission control device receives a message for system recognition, sending a message to said loop transmission line from said transmission control device after adding an address of that transmission control device to said received message for system recognition; and (b) relaying address information regarding said transmission control devices included in said message for system recognition to another loop transmission line when said relay apparatus receives a message for system recognition from a loop transmission line connected to said relay apparatus; and (c) sending said message for system recognition to one of said terminal devices connected to each of said transmission control devices, when said transmission control device having a loop train content code representing said message for system recognition receives said message for system recognition containing said loop train content code.

8. A system structure recognition method for a multiloop transmission system having a plurality of loop transmission lines, a plurality of transmission control devices each connected in one of said loop transmission lines, a plurality of terminal devices each connected to one of said transmission control devices and at least one relay apparatus for connecting said loop transmission lines to each other, comprising the steps of:

(a) when a transmission control device receives a message for system recognition, sending a message to said loop transmission line from said transmission control device after adding an address of that transmission control device to said received message for system recognition; and (b) relaying address information regarding said transmission control devices included in said message for system recognition to another loop transmission line when said relay apparatus receives a message for system recognition from a loop transmission line connected to said relay apparatus; and (c) inserting the address of said transmission control device in the source address portion indicating the address of the transmission source of said message for system recognition, when said transmission control device has received said message for system recognition from one of said relay apparatuses; and a step of eliminating said message for system recognition, when said transmission control device connected to said relay apparatus has received said message containing an address corresponding to the address of that transmission control device in said source address portion.

9. A system structure recognition method for a multiloop transmission system consisting of a plurality of loop transmission lines, a plurality of transmission control devices each of which is connected in one of said loop transmission lines, a plurality of terminal devices each connected to a respective one of said transmission control devices, and relay processor means having relay processors connecting two transmission control devices disposed in respective loop transmission lines, comprising:

(a) a step of sending a loop train message to a first loop transmission line, which message contains a content code portion indicating a recognition demand, a source address portion indicating as the address of the transmission source a particular address allocated to a transmission control device and a data portion for determining the system structure, when a demand for system structure recognition reaches said transmission control devices;

(b) a step of sending said loop train message to one of said loop transmission lines from a transmission control device after having added thereto the address of said transmission control device in the data portion thereof;

(c) a step, in which said loop train message, having a flag address indicating that said loop train message has passed through a transmission control device on one of said loop transmission lines connected to said relay processor, is sent to another of said loop transmission lines connected to said relay processor;

(d) a step of inserting in said loop train message as the address of said transmission source the address of the transmission control device disposed on said other of said loop transmission lines which is connected to said relay processor and sending said loop train message to said other one of said loop transmission lines;

(e) a step of taking said loop train message, which has circulated through said plurality of loop transmission lines and has returned, in said transmission control device, which has demanded the system structure recognition; and (f) a step of transmitting further said loop train message, which has returned, to said first loop transmission line and eliminating said loop train message on the basis of a judgment in said relay processor connected with said other of said loop transmission lines that the address of said transmission source corresponds to the address registered in said loop train message.

10. A system structure recognition method according to claim 9, further comprising a step of eliminating said loop train message, which has returned after having circulated through the system, when said relay processor detects that three of said flag addresses are added in said data portion of said message.

11. A system structure recognition method according to claim 9, further comprising:

a step of judging whether the first address of the address series in said data portion of said loop train message, which has returned after having circulated through the system, is equal to the last address or not;

a step of obtaining an address series, which is divided into a plurality of groups by using said flag addresses in said address series; and a step of compiling said address series by using forward pointers for counting up loop numbers and backward pointers for counting down loop members in order to couple the groups of the divided address series with each other.

12. A system structure recognition method according to claim 11, further comprising a step of grouping the addresses in said data portion in said plurality of groups, combining them, connecting them in a compiled format, and displaying them.

13. A system structure recognition method for a multiloop transmission system for recognizing the system structure of a transmission system consisting of a plurality of loop transmission lines, a plurality of terminals connected with each of a plurality of transmission control devices disposed on each of said loop transmission lines, and relay terminals connecting two transmission control devices disposed on adjacent two of said loop transmission lines with each other, comprising;

(a) a step of storing a content code indicating the sort of messages, which each of said terminals wants to have, in a register of each of said transmission control devices connected with said terminal;

(b) a step of sending. the content of said message to said terminal connected to said transmission control device, when the content code in said message flowing through said transmission lines is in accordance with said content code stored in the register of said transmission control device;

(c) a step of sending said message to said loop transmission lines after having added the own address of said transmission control device to the data portion of said message, when said transmission control device detects that the content code in said message is a loop recognition code indicating the structure recognition of said loop transmission lines; and (d) a step, in which, when said message having passed through one of said relay terminals is received by the other terminal disposed on another loop transmission line and connected to said relay terminal, said message is sent to said another loop transmission line after having inserted the terminal address of said another loop transmission line in the source address portion indicating the transmission source of said message.

14. A system structure recognition method for a multiloop transmission system having a plurality of loop transmission lines, a plurality of transmission control devices each connected in one of said loop transmission lines, a plurality of terminal devices each connected to one of said transmission control devices and at least one relay apparatus for connecting a transmission control device on one of said loop transmission lines to a transmission control device on another loop transmission device, comprising the steps of:

(a) when a transmission control device receives a message for system recognition, sending a message to said loop transmission line from said transmission control device after adding an address of that transmission control device to said received message for system recognition; and (b) relaying address information regarding said transmission control devices included in said message for system recognition received from a loop transmission line connected to said relay apparatus and information relating to the relay apparatus to another loop transmission line.

15. A system structure recognition method for a multiloop transmission system according to claim 14, including a step of recognizing a structure of multiloop transmission lines based on successive addresses regarding said transmission control devices included in a data portion of said message for system recognition which has circulated through said multiloop transmission system.

16. A system structure recognition method for a multiloop transmission system having a plurality of loop transmission lines, a plurality of transmission control devices each connected in one of said loop transmission lines, a plurality of terminal devices each connected to one of said transmission control devices and at least one relay apparatus for connecting said loop transmission lines to each other, comprising the steps of:

(a) when a transmission control device receives a message for system recognition, sanding a message to said loop transmission line from said transmission control device after adding an address of that transmission control device to said received message for system recognition;

(b) relaying address information regarding said transmission control devices included in said message for system recognition received from a loop transmission line connected to said relay apparatus and information relating to the relay apparatus to another loop transmission line; and (c) recognizing an interconnection structure in said multiloop transmission system having a plurality of loop transmission lines based on said message for system recognition circulated through said multiloop transmission system.

17. A system structure recognition method for a multiloop transmission system having a plurality of loop transmission lines, a plurality of transmission control devices each connected in one of said loop transmission lines, a plurality of terminal devices each connected to one of said transmission control devices and at least one relay apparatus for connecting said loop transmission lines to each other, comprising the steps of:

(a) when a transmission control device receives a message for system recognition, sending a message to said loop transmission line from said transmission control device after adding an address of that transmission control device to said received message for system recognition; and (b) when said at least one relay apparatus receives said message for system recognition from a loop transmission connected to said at least one relay apparatus, relaying said received message for system recognition to another loop transmission line after adding information indicating a relay to said received message for system recognition.

18. A system structure recognition method for a multi-loop transmission system having n loop transmission lines (n is an integer greater than one), a plurality of transmission control devices each connected in one of said loop transmission lines, a plurality of terminal devices each connected to a respective one of said transmission control devices and (n−1) relay devices each responsive to the content of a message for connecting a pair of loop transmission lines to each other via a transmission control device in each of the pair of loop transmission lines, comprising the steps of:

(a) when a transmission control device receives a message for system recognition, sending a message to said loop transmission line from said transmission control device after adding an address of that transmission control device to said received message for system recognition;

(b) relaying address information regarding said transmission control devices included in said message for system recognition received from a loop transmission line connected to said relay apparatus and information relating to the relay apparatus to another loop transmission; and (c) recognizing an interconnection structure of said transmission control devices and said relay devices in said multi-loop transmission system based on said message for system recognition circulated through said multi-loop transmission system.

19. A system structure recognition method according to claim 18, further comprising the step of adding, in a relay device, information representing a relay operation between loop transmission lines and an address of the relay device to said system recognition message.

* * * * *